(12) United States Patent
Baez et al.

(10) Patent No.: US 11,457,295 B2
(45) Date of Patent: Sep. 27, 2022

(54) HIGH PRESSURE WATER PROTECTION LEVEL SPEAKER

(71) Applicant: Continental Automotive Systems, Inc., Auburn Hills, MI (US)

(72) Inventors: David Marron Baez, Jalisco (MX); Irving Morales Rodriguez, Jalisco (MX); Enrique Chavez Luna, Jalisco (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 389 days.

(21) Appl. No.: 16/692,055

(22) Filed: Nov. 22, 2019

(65) Prior Publication Data

US 2021/0160599 A1 May 27, 2021

(51) Int. Cl.
*H04R 1/02* (2006.01)
*B60R 11/02* (2006.01)
*B60K 37/02* (2006.01)
*B60R 11/00* (2006.01)

(52) U.S. Cl.
CPC ............ *H04R 1/023* (2013.01); *B60K 37/02* (2013.01); *B60R 11/0217* (2013.01); *H04R 1/025* (2013.01); *B60R 2011/0005* (2013.01); *H04R 2499/13* (2013.01)

(58) Field of Classification Search
CPC ............................ B60R 11/0217; H04R 1/023
USPC ................................................ 296/70, 1.07
See application file for complete search history.

(56) References Cited

U.S. PATENT DOCUMENTS

| | | | | |
|---|---|---|---|---|
| 3,679,023 | A * | 7/1972 | Rankin | H04R 1/023 181/155 |
| 3,909,530 | A * | 9/1975 | Gosswiller | H04R 1/023 181/194 |
| 3,989,909 | A * | 11/1976 | Hodsdon | H04R 1/023 D14/196 |
| 7,840,021 | B2 * | 11/2010 | Greco | H04R 1/023 381/334 |
| 11,202,135 | B2 * | 12/2021 | Vavron | H04R 9/06 |
| 2006/0177089 | A1 | 8/2006 | Greco et al. | |

FOREIGN PATENT DOCUMENTS

| | | | |
|---|---|---|---|
| DE | 1487317 A1 | 4/1969 | |
| FR | 2748627 A1 | 11/1997 | |
| WO | WO-2018043224 A1 * | 3/2018 | ......... B60R 11/0217 |

* cited by examiner

*Primary Examiner* — Dennis H Pedder

(57) ABSTRACT

A vehicle instrument panel assembly includes a front panel, a speaker disposed within the front panel for generating sounds and a cover disposed over the speaker. The cover includes a plurality of openings for the transmission of sound and a corresponding plurality of blockers at each of the plurality of openings. Each of the plurality of blockers includes a front face that is spaced apart forward of a corresponding one of the plurality of openings for blocking water intrusion.

16 Claims, 5 Drawing Sheets

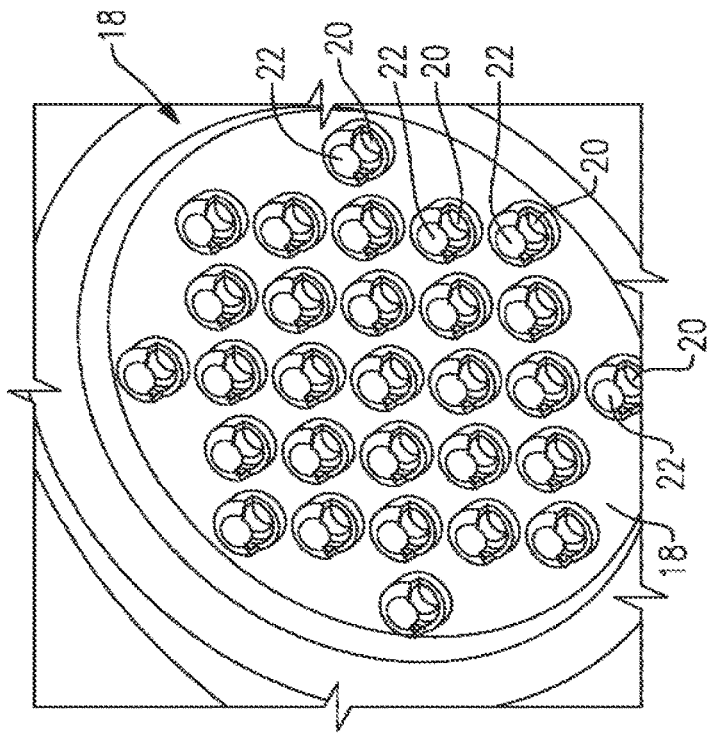
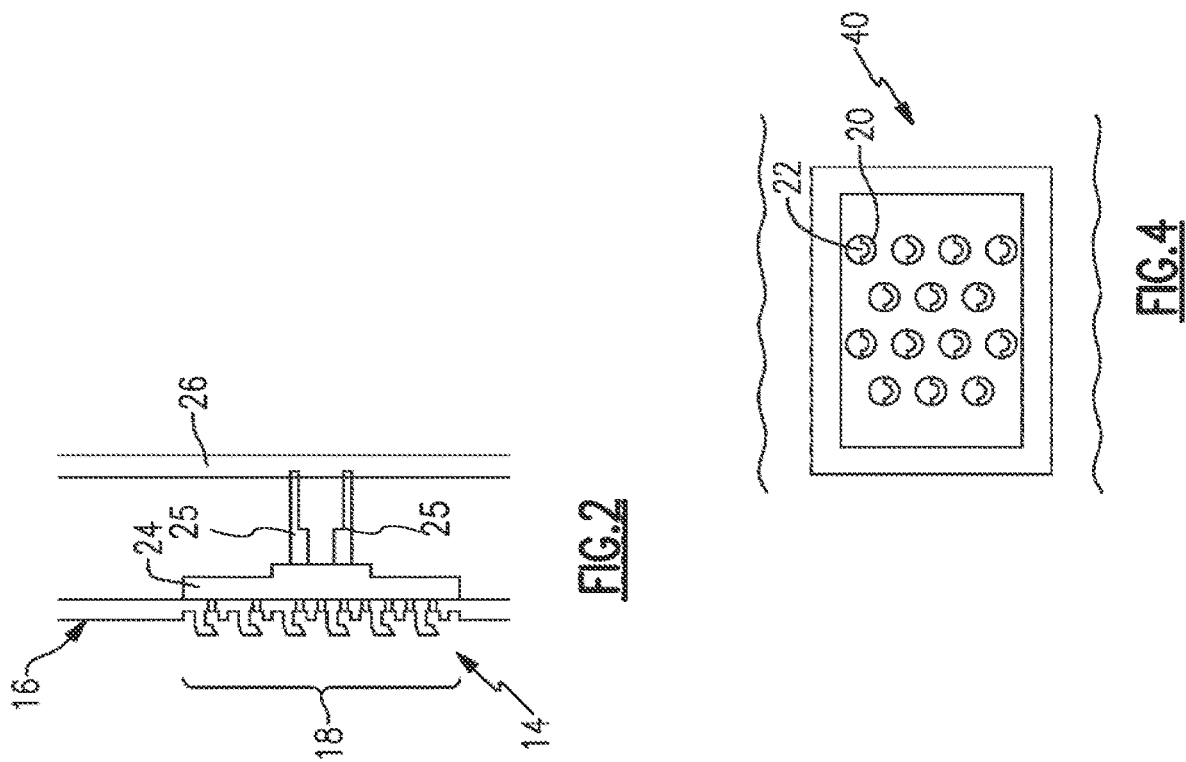

HIGH PRESSURE WATER PROTECTION LEVEL SPEAKER

TECHNICAL FIELD

The present disclosure relates to speakers for vehicle instrument panels that are rated for exposure to severe environmental conditions and direct application of a high pressure stream.

BACKGROUND

Vehicles that have open instrument panels are designed for exposure to severe weather including wind and rain. The instrument panels can include a speaker to provide audible feedback and warnings to an operator. Weather proofing structures that protect the speakers against harsh environments can limit the range of sounds that can be produced. Additionally, some speakers are designed to withstand direct application of water pressure to accommodate high pressure washing of a vehicle interior. The additional structures required to accommodate high pressure application of water can also reduce the range of sounds capable of being reasonably produced by a speaker.

Vehicle and component manufacturers continually seek ways to improve product performance and capabilities.

SUMMARY

A vehicle instrument panel assembly according to a non-limiting example embodiment includes, among other possible things, a front panel, a speaker disposed within the front panel for generating sounds and a cover disposed over the speaker. The cover including a plurality of openings for the transmission of sound and a corresponding plurality of blockers at each of the plurality of openings. Each of the plurality of blockers includes a front face that is spaced apart forward of a corresponding one of the plurality of openings for blocking water intrusion.

In another disclosed example of the foregoing vehicle instrument panel assembly, the blocker defines a passage between a corresponding one of the plurality of openings, the passage including a first portion that extends forward from the opening and a second portion that is transverse to the first portion.

In another disclosed example of any of any the foregoing vehicle instrument panel assemblies, the blocker includes a first side and a second side that at least partially defines the first portion of the passage In another disclosed example of any of the foregoing vehicle instrument panel assemblies, the front face is disposed on the first side and extends over the first portion of the passage In another disclosed example of any of the foregoing vehicle instrument panel assemblies, the second side is shorter than the first side and the second portion of the second portion of the passage is disposed between an end of the second side and the front face.

In another disclosed example of any of the foregoing vehicle instrument panel assemblies, the front face is semi-circular with a radius that corresponds to a radius of a corresponding one of the plurality of openings.

In another disclosed example of any of the foregoing vehicle instrument panel assemblies, the speaker and cover are circular.

In another disclosed example of any of the foregoing vehicle instrument panel assemblies, the cover is rectangular.

In another disclosed example of any of the foregoing vehicle instrument panel assemblies, the cover is an integral portion of the front panel.

In another disclosed example of any of the foregoing vehicle instrument panel assemblies, the cover is a part separate from the front panel.

A speaker assembly for a vehicle instrument panel according to another disclosed non-limiting embodiment includes, among other possible things, a speaker for generating sounds and a cover disposed over the speaker, the cover including a plurality of openings for the transmission of sound and a corresponding plurality of blockers at each of the plurality of openings, each of the plurality of blockers includes a front face that is spaced apart forward of a corresponding one of the plurality of openings for blocking water intrusion.

In another disclosed example of the foregoing speaker assembly, the blocker defines a passage between a corresponding one of the plurality of openings, the passage including a first portion that extends forward from the opening and a second portion that is transverse to the first portion.

In another disclosed example of any of the foregoing speaker assemblies, the blocker includes a first side and a second side that at least partially defines the first portion of the passage.

In another disclosed example of any of the foregoing speaker assemblies, the front face is disposed on the first side and extends over the first portion of the passage.

In another disclosed example of any of the foregoing speaker assemblies, the second side is shorter than the first side and the second portion of the second portion of the passage is disposed between an end of the second side and the front face.

In another disclosed example of any of the foregoing speaker assemblies, the front face is semi-circular with a radius that corresponds to a radius of a corresponding one of the plurality of openings.

In another disclosed example of any of the foregoing speaker assemblies, the speaker and cover are circular.

In another disclosed example of any of the foregoing speaker assemblies, the cover is rectangular.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a side view of an example speaker assembly embodiment.

FIG. 3 is a perspective view of a cover of the example speaker assembly.

FIG. 4 is an enlarged view of another speaker assembly embodiment.

DETAILED DESCRIPTION

Figure 1:
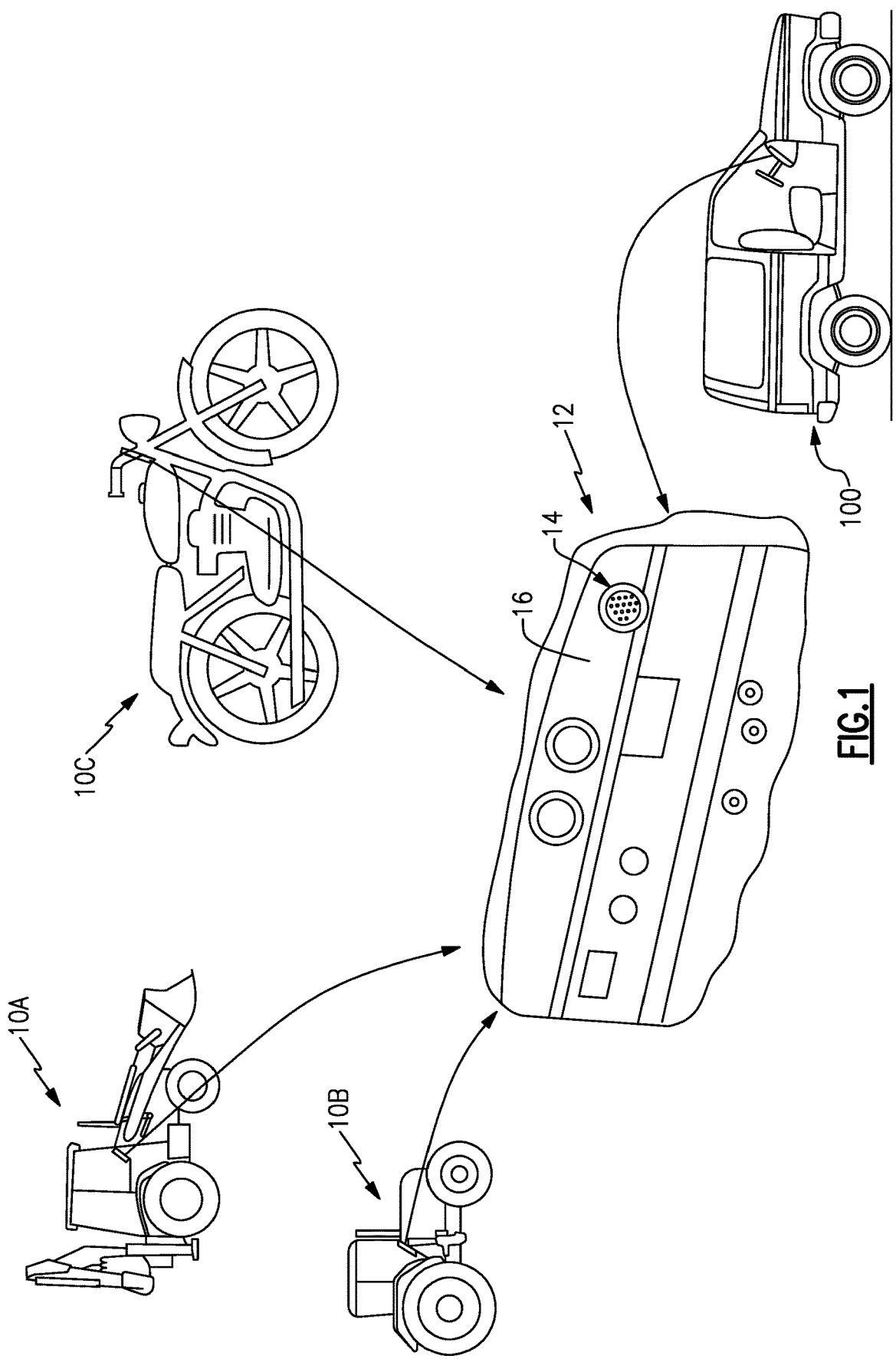
FIG. 1 is a schematic view of several example vehicles and an example instrument panel assembly configured for exposure to an outside environment.

Referring to FIG. 1, vehicles that have an instrument panel that is exposed to weather and the elements are schematically shown at 10a, 10b and 10c. The vehicles are shown as farm equipment 10a, 10b, a motorcycle 10c and/or a truck 10d or other commercial vehicle that have instrument panels that are exposed to the elements and facing a driver. The example instrument panel 12 can include various devices and controls and additionally a speaker assembly 14. The speaker assembly 14 provides for the generation of audible alerts to an operator.

A standard for waterproof devices classifies varying degrees of capabilities for operating upon exposure to the weather and water. One level of classification requires that the speaker assembly 14 remain operable upon exposure to a direct jet of water. The standard is know as the "IP" standard as is a standard drawn up by the International Electrotechnical Commission (IEC). The IP is a standard to determine and classify how resistant an electrical device, such as a speaker, is to fresh water and common contaminants such as dirt dust and sand. The first digit after the "IP" is the resistance level to solids and the second digit is the water resistance level. The classification known as IPX9 corresponds with a capability to maintain operation after exposure to a direct high pressure water and steam-jet cleaning. The disclosed speaker assembly 14 includes features for meeting the requirements of the IPX9 classification.

Referring to FIGS. 2 and 3 with continued reference to FIG. 1, the instrument panel 12 includes a front panel 16. The speaker assembly 14 includes a cover 18 that in one disclosed example is an integral portion of the front panel 16. In another disclosed embodiment, the cover 18 is a portion separate from the front panel 16. The cover 18 is a plastic molded part that is assembled over a speaker 24 that is powered by connections 25 to a printed circuit board 26 in this example embodiment. As appreciated, the speaker 24 may be connected in any manner to a power source within the scope and contemplation of this disclosure. The speaker 24 is of a waterproof configuration that is sufficient to maintain operation upon limited exposure to water. However, the example speaker 24 is not configured to withstand the direct application of a high pressure stream of water.

Accordingly, the speaker cover 18 includes features that prevent direct application of high pressure water against the speaker 24. The cover 18 includes a plurality of openings 20 to enable the propagation of sound. Each of the openings 20 are at least partially covered by a blocker 22. The blocker 22 is an integral part of the cover 18 and defines a tortuous path to the corresponding opening 20 that prevents high pressure water from directing impacting the speaker 24.

The disclosed speaker cover 18 is round and includes the plurality of openings 20 and blockers 22 orientated within a circular perimeter. However, the example speaker cover 18 may also be other shapes such as rectangular as is indicated at 40 in FIG. 4. The openings 20 and blockers 22 can be the same as disclosed in FIG. 3. Moreover, although round opening 20 and curved blockers 22 are disclosed by way of example, other shapes could be utilized and are within the contemplation and scope of this disclosure.

Figure 5:
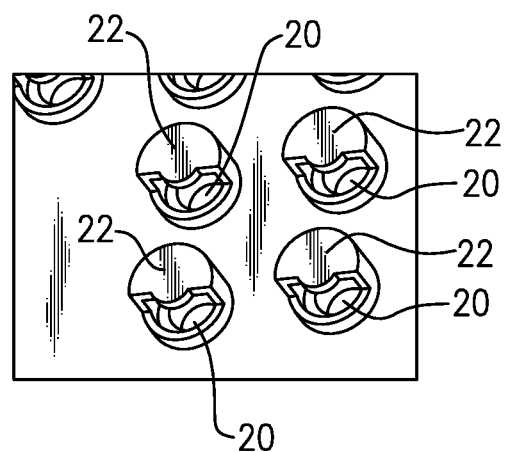
FIG. 5 is a perspective view of openings through an example cover for a speaker assembly.
Figure 6:
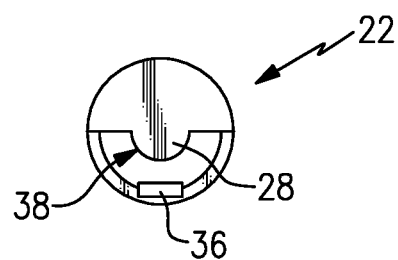
FIG. 6 is a top view of an example blocker covering openings in the example speaker assembly.
Figure 7:
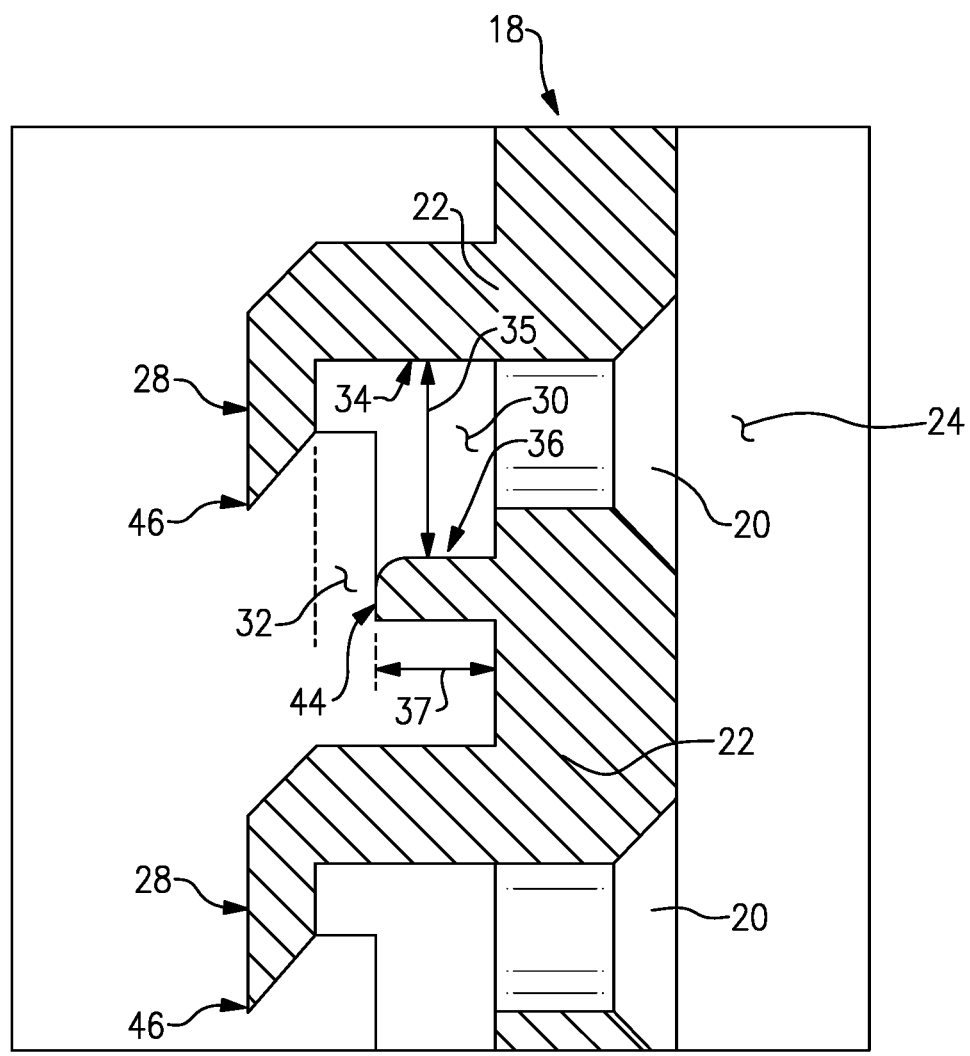
FIG. 7 is a cross-sectional view of an example cover for a speaker assembly.

Referring to FIGS. 5, 6 and 7 within continued reference to FIG. 2, each of the example blockers 22 includes a front face 28 disposed at the end of a first side wall 34. The front face 28 extends transverse from the first side wall 34 to cover the opening 20. The opening 20 is open to a passage that includes a first portion 30 and a second portion 32. The first portion 30 is defined between the first side wall 34 and a second side wall 36. The second portion 32 is defined under the front face 28 and is transverse to the first portion 30. The front face 28 includes a radius 38 that corresponds with the radius of the opening 20. The front face 28 covers the opening 20 such that a jet of water cannot be directed through the opening and against the speaker 24.

The second side wall 36 extends upward parallel to the first side wall 34 and transverse to the front face 28. The second side wall 36 is disposed on a side of the opening 20 opposite the first side wall 34. An end 44 of the side wall is set a distance 35 from the first side wall 34 and includes a length 37 that prevents a direct line from entering the opening 20. Instead, for any angle between the first wall 34 and the second wall 36, a turn is required. The required turn prevents the direct application of a water jet through the opening 20 and against the speaker 24. An end 46 of the front face 28 along with the end 44 of the second wall 44 provide blocking of any angular application of water from penetrating directly through the opening 20. As appreciated, any angular application of a water stream would either hit the end of the second side wall 36 or impact against the first side wall 34. Accordingly, the end 46 of the front face 28 and the end 44 of the second side wall 36 are orientated such that water will not directly penetrate through the cover 18.

Figure 8:
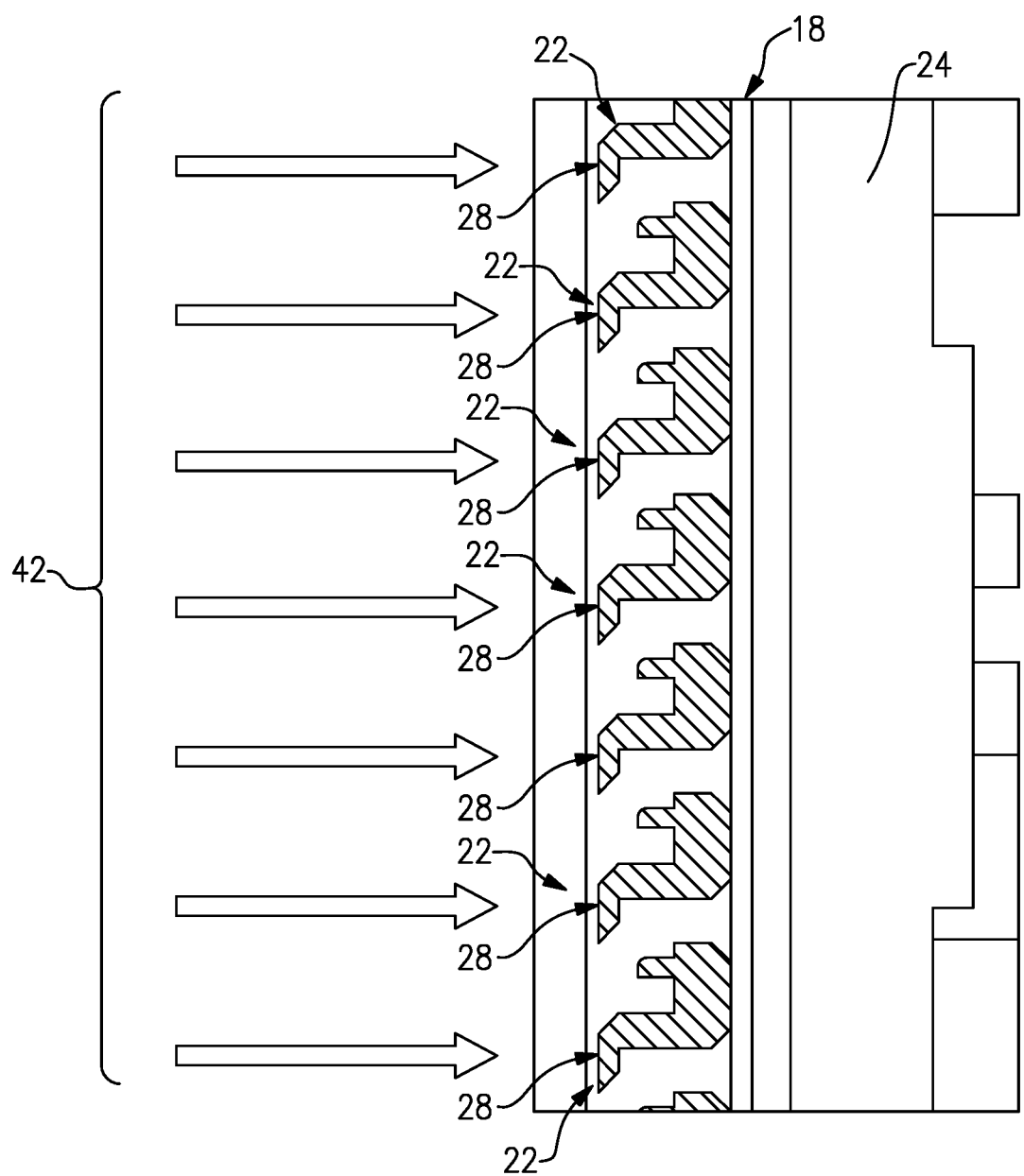
FIG. 8 is another cross-sectional view of an example cover for a speaker assembly.

Referring to FIG. 8, the cover 18 is shown in cross-section relative to a direct jet of water 42. The direct jets of water 42 will impact the front face 28 of each blocker 22 and drain downward away from the cover 18. Any water that may drip or drain through the cover 18 is not of sufficient pressure to impact operation of the waterproof speaker 24. Additionally, because the blockers 22 define a transverse but unblocked path for air, sound propagation from the speaker 24 is unimpeded. Moreover, the unimpeded path for sound is such that the volume of the speaker 24 is not muffled or otherwise reduced. Moreover, the path defined through the blocker 22 enables the generation and practical use of wider variety of sounds from the speaker 24.

Accordingly, the example speaker assembly 14 includes a cover 18 that blocks the direct application of water pressure while providing an unblocked path for air that enables the unimpeded propagation of sound.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle instrument panel assembly comprising:
a front panel;
a speaker disposed within the front panel for generating sounds;
a cover disposed over the speaker, the cover including a plurality of openings for the transmission of sound and a corresponding plurality of blockers at each of the plurality of openings, each of the plurality of blockers includes a front face that is semi-circular with a radius corresponding to a radius of a corresponding one of the plurality of openings and is spaced apart forward of the corresponding one of the plurality of openings for blocking water intrusion.

2. The vehicle instrument panel assembly as recited in claim 1, wherein the blocker defines a passage between a corresponding one of the plurality of openings, the passage including a first portion that extends forward from the opening and a second portion that is transverse to the first portion.

3. The vehicle instrument panel assembly as recited in claim 2, wherein the blocker includes a first side and a second side that at least partially defines the first portion of the passage.

4. The vehicle instrument panel assembly as recited in claim 3, wherein the front face is disposed on the first side and extends over the first portion of the passage.

5. The vehicle instrument panel assembly as recited in claim 4, wherein the second side is shorter than the first side and the second portion of the passage is disposed between an end of the second side and the front face.

6. The vehicle instrument panel assembly as recited in claim 1, wherein the speaker and cover are circular.

7. The vehicle instrument panel assembly as recited in claim 1, wherein the cover is rectangular.

8. The vehicle instrument panel assembly as recited in claim 1, wherein the cover is an integral portion of the front panel.

9. The vehicle instrument panel assembly as recited in claim 1, wherein the cover is a part separate from the front panel.

10. A speaker assembly for a vehicle instrument panel, comprising:

a speaker for generating sounds;

a cover disposed over the speaker, the cover including a plurality of openings for the transmission of sound and a corresponding plurality of blockers at each of the plurality of openings, each of the plurality of blockers includes a front face that is semi-circular with a radius corresponding to a radius of a corresponding one of the plurality of openings and is spaced apart forward of the corresponding one of the plurality of openings for blocking water intrusion.

11. The speaker assembly as recited in claim 10, wherein the blocker defines a passage between a corresponding one of the plurality of openings, the passage including a first portion that extends forward from the opening and a second portion that is transverse to the first portion.

12. The speaker assembly as recited in claim 11, wherein the blocker includes a first side and a second side that at least partially defines the first portion of the passage.

13. The speaker assembly as recited in claim 12, wherein the front face is disposed on the first side and extends over the first portion of the passage.

14. The speaker assembly as recited in claim 13, wherein the second side is shorter than the first side and the second portion of the passage is disposed between an end of the second side and the front face.

15. The speaker assembly as recited in claim 10, wherein the speaker and cover are circular.

16. The speaker assembly as recited in claim 10, wherein the cover is rectangular.

\* \* \* \* \*